United States Patent
Kondo

[11] Patent Number: 5,633,089
[45] Date of Patent: May 27, 1997

[54] SORBITAN ESTER LUBRICANT AND MAGNETIC RECORDING MEDIUM EMPLOYING THE SAME

[75] Inventor: Hirofumi Kondo, Miyagi, Japan

[73] Assignee: Sony Corporation, Tokyo, Japan

[21] Appl. No.: 532,878

[22] Filed: Sep. 22, 1995

[30] Foreign Application Priority Data

Sep. 28, 1994 [JP] Japan .................................. 6-233100
Nov. 22, 1994 [JP] Japan .................................. 6-288259

[51] Int. Cl.$^6$ ............................................. G11B 5/71
[52] U.S. Cl. .................. 428/421; 428/457; 428/694 BF; 428/694 TF; 428/900; 252/62.54; 508/182; 508/311; 549/417; 549/418
[58] Field of Search .................. 428/421, 457, 428/694 BF, 694 TF, 900; 252/62.54, 54.6, 56 R; 549/417, 418; 508/182, 311

[56] References Cited

U.S. PATENT DOCUMENTS

| | | | |
|---|---|---|---|
| 4,305,995 | 12/1981 | Ota et al. | 428/423.1 |
| 4,497,864 | 2/1985 | Ryoke et al. | 428/323 |
| 4,696,869 | 9/1987 | Funahashi | 428/695 |

FOREIGN PATENT DOCUMENTS 62-103834  5/1987  Japan .

*Primary Examiner*—Stevan A. Resan

[57] ABSTRACT

There is provided a lubricant which is produced by dissolving a sorbitan ester compound in a solvent such as hexane or toluene. In the sorbitan ester compound, at least one of hydroxyl groups of 1,5-sorbitan is linked by ester linkage to a perfluoro polyether having a terminal carboxyl group and at least an other hydroxyl group is linked by ester linkage to a hydrocarbon having a terminal carboxyl group. There is also provided a thin magnetic metal film type magnetic recording medium or a coated magnetic recording medium in which the above lubricant is held on the surface of a magnetic layer. The lubricant exhibits superior lubricating effects under all conditions and is capable of maintaining the lubricating effects for prolonged time. Consequently, the magnetic recording medium which has the lubricant held on the magnetic layer exhibits superior running durability and resistance against abrasion.

7 Claims, No Drawings

5,633,089

SORBITAN ESTER LUBRICANT AND MAGNETIC RECORDING MEDIUM EMPLOYING THE SAME

BACKGROUND OF THE INVENTION

This invention relates to a lubricant employed for assuring running durability of a magnetic recording medium and a magnetic recording medium having the lubricant held on its magnetic layer.

In general, a magnetic recording medium, especially a magnetic tape, is run at an elevated velocity in sliding contact with a magnetic head in the course of writing/readout of magnetic signals. Such running of the magnetic tape must be made smoothly and under a stabilized condition. Since the magnetic layer of the magnetic recording medium has its surface smoothed for effecting high-density recording, it is increased in its effective contact area with sliding components, such as a magnetic head or a guide roll, during sliding, so that the phenomenon of agglutination or sticking tends to be produced. In particular, in the case of a thin magnetic metal film type magnetic recording medium, in which a magnetic metal material is deposited by evaporation on a non-magnetic substrate so as to be used as a magnetic layer, the above-mentioned problem related with rise in the frictional coefficient is liable to occur because of the extremely smooth surface of the magnetic layer.

For example, in the case of an 8-mm vide deck, a magnetic tape is placed around a drum along ten or more guide pins and is run by a pinch roll and a capstan under a tape tension of about 20 g and at a running velocity of 0.5 cm/second. Since the magnetic layer of the magnetic tape is contacted with stainless steel guide pins, the magnetic tape undergoes stick slip to produce a hissing sound with increase in the frictional coefficient between the magnetic tape and the guide pin. If the hissing sound is produced from the running tape during reproduction, a "cramped" playback picture is produced.

In the paused state, the magnetic head is run at an elevated velocity through the same area of the magnetic tape, so that, if the frictional coefficient is increased, the magnetic layer is worn out to lower the playback output. In particular, with the thin magnetic metal type magnetic tape, in which the magnetic layer is of an extremely thin thickness, such wear of the magnetic tape raises a serious problem.

If the magnetic head is to have a contact start step (CSS) with respect to the magnetic disc, as in the case of a hard disc device, the problem related with rise in the frictional coefficient is produced. The reason is that the magnetic head is slid in contact with the magnetic disc during floating and landing of the magnetic head. If, in such case, the frictional coefficient is increased, not only the problem of the wear to the magnetic layer of the magnetic disc but also the problem of head crushing is incurred. For assuring reliability of the product quality, the frictional coefficient after 20,000 times of CSS operations is desirably 0.5 or less.

For solving the problems caused by rise in the frictional coefficient and the problem of running durability as mentioned above, it is contemplated to use a variety of lubricants. For this reason, attempts have been made for top-coating the lubricant on the magnetic layer or incorporating the lubricant in a magnetic coating in the case of a coated type magnetic recording medium.

It is required of the lubricant to be (i) superior in low-temperature properties for assuring pro-set lubricating effects for use in frigid districts, (ii) coatable to an extremely small thickness to reduce the spacing loss with respect to the magnetic head to as small a value as possible and (iii) usable and be able to maintain lubricating effects for a long time, to say nothing of having optimum lubricating effects with respect to the magnetic head.

For accomplishing the above properties with a film thickness of a molecular level, that is on the order of several nanometers, it is necessary to investigate the molecular structure of compounds making up the lubricant. Among the lubricants now in use as lubricants for a magnetic recording medium, there are a silicon-based lubricant, a hydrocarbon based lubricant and a lubricant composed of fluorine compounds.

The lubricant composed of a silicon-based compound are used for a coated type magnetic recording medium because the lubricant is superior in thermal stability and low in vapor pressure. However, if the lubricant is applied to a thin magnetic metal film type magnetic recording medium, sufficient lubricating effects cannot be produced, such that the design statements for durability are not met on accelerated abrasion tests for pin-on discs or CSS tests.

The lubricant composed of a hydrocarbon compound is prevalently employed for a coated type magnetic recording medium. However, it is inferior to the lubricant composed of a fluorine compound in thermal or chemical stability. On the other hand, since the frictional polymer is yielded due to reaction produced by friction, the lubricating effects are lowered, while fatal troubles may also be incurred. If used for a thin magnetic metal film type magnetic recording medium, the lubricant composed of the hydrocarbon compound exhibits superior lubricating effects. However, the lubricant can hardly be put to practical use because of high vapor pressure.

On the other hand, the lubricant composed of a fluorine compound is now employed most extensively. In particular, the lubricant containing perfluoro polyether is employed widely because it is excellent in lubricating effects and surface protective effects. The reason is that perfluoro polyether is lower in viscosity than other compounds having a comparable molecular weight, because the ether linkage $CF_2$—O—$CF_2$ is flexible, and that the viscosity is not changed over a wider temperature range. Chemical inactivity, low vapor pressure and excellent water-repellency of the lubricant may also be recited as contributing factors.

The properties of perfluoro polyether depend appreciably on the repetitive units of the main chain. For example, perfluoro polyether per se is chemically unstable so that it is insufficient in absorbent power with respect to the surface of the magnetic layer. However, if polar groups, such as hydroxyl groups or piperonyl groups, are introduced as terminal groups, the absorbent power is improved, thus increasing durability of the magnetic recording medium.

Although the lubricant composed of a perfluoro polyether compound has superior characteristics as lubricant for a magnetic recording medium, it is open to doubt whether the lubricant can cope with the problem of high heat of friction concomitant with the progressively increasing processing speed of the magnetic recording system. Although the reliable method for measuring the heat of friction has not been established to date, it is estimated that the heat of friction reaches several hundred degrees centigrade in case the relative velocity between the magnetic recording medium and the magnetic head exceeds several meters per second.

Although perfluoro polyether is stable in air even at a temperature higher than 350° C., it is estimated that the reaction of decomposition is promoted at the above-mentioned elevated temperatures in the presence of metal alloys, such as iron or titanium alloys, Louis acids, such as $AlCl_3$, FeF or $Al_2O_3$ or Louis base. If the reaction of decomposition occurs, the lubricating effect is deteriorated, with the result that the operational reliability of the magnetic recording system is lowered.

On the other hand, perfluoro polyether suffers from the problem that it is not soluble in general-purpose solvents such that a so-called Freon based solvents need to be employed.

SUMMARY OF THE INVENTION

It is therefore an object of the present invention to provide a lubricant which is capable of maintaining superior lubricating effects and surface protective effects even under high heat of friction and which is composed of a compound soluble in the general-purpose solvent.

It is another object of the present invention to provide a magnetic recording medium which employs such lubricant and which is excellent in running performance, resistance against abrasion and in durability.

According to the present invention, there is provided a lubricant composed of a sorbitan ester compound having a structure in which at least one of hydroxyl groups of 1,5-sorbitan is linked by ester linkage with a perfluoro polyether having a terminal carboxyl group and at least an other hydroxyl group is linked by ester linkage to a hydrocarbon having a terminal carboxyl group.

The sorbitan ester compound employed in the present invention is represented by the following formula (1):

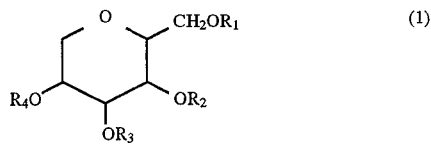

where at least one of $R_1$, $R_2$, $R_3$ and $R_4$ is a perfluoro polyether group having a terminal carboxylic group and at least an other is a hydrocarbon group having a terminal carbonyl group, with the remaining being all hydrogen.

The perfluoro polyether group having a terminal carbonyl group, constituting one of the substituents $R_1$ to $R_4$ in the above formula (1), may be exemplified by those represented by the formulas (2) to (6):

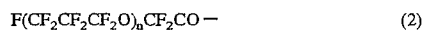

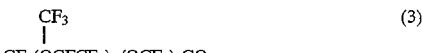

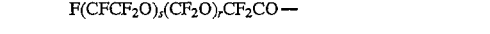

In the above chemical formulas (2) to (6), k, l, m, n, p, q, r and s are integers not less than 1. The molecular weight of each of these substituents is preferably on the order of 600 to 5000. If the molecular weight is excessive, the effect of the terminal group is diminished, whereas, if the molecular weight is too small, the effect of the perfluoro polyether is diminished. The terminal carbonyl group present in each of these substituents is formed by all ester linkage of a carboxylic group possessed by the perfluoro polyether and the hydroxyl group of sorbitan. Although the perfluoro polyether group shown in the chemical formula (6) is of a structure having a carbonyl group in each terminal end, this structure is formed by ester linkage between the terminal carboxylic groups of the perfluoro polyether with the hydroxyl groups of different sorts of sorbitan.

On the other hand, there is no particular limitation to the molecular weight or the number of carbon atoms of the hydrocarbon group having terminal carbonyl group which hydrocarbon group constitutes at least an other of the substituents represented by $R_1$ to $R_4$, such that it may be any one of the alicyclic hydrocarbon, an aromatic hydrocarbon or a chain hydrocarbon. However, in consideration of the frictional coefficient reducing effect or the solubility in solvent, the hydrocarbon group is conveniently constituted by long-chain hydrocarbon having ten or more carbon atoms. The long-chain hydrocarbon group may be saturated or unsaturated or branched, as desired.

The above-described sorbitan-ester compound may be dissolved in a hydrocarbon solvent, such as hexane or toluene, so as to be employed as lubricant for a magnetic recording medium.

The magnetic recording medium according to the present invention has at least a magnetic layer formed on the non-magnetic substrate. The above-mentioned lubricant composed of the sorbitan-ester compound is held on the surface of the magnetic layer.

The magnetic layer on which the lubricant is held may be a magnetic layer formed by a thin magnetic metal film or a magnetic layer consisting mainly in a coated magnetic paint composed of magnetic powders and a binder.

For having the lubricant held on the surface of the magnetic layer, the magnetic layer is first formed and the lubricant is subsequently coated on the magnetic layer. If the magnetic layer is formed by coating a magnetic paint, the lubricant may be added to the magnetic paint. In any case, it is preferred that the above-mentioned sorbitan-ester compound be held in an amount of 0.5 mg to 100 mg and desirably 1 to 20 mg per square meter of the magnetic layer. If the amount of the sorbitan-ester compound is too little, the effect of reducing the frictional coefficient or the effect of improving the resistance against abrasion or durability is not manifested. Conversely, if the amount is excessive, agglutination occurs between the sliding member and the magnetic layer resulting in poor running performance. Head clogging in which powder debris from the magnetic layer becomes attached to the magnetic head, may be produced thus obstructing normal recording/reproduction.

For having the lubricant held on the magnetic layer, it is possible to employ a sorbitan compound alone or two or more sorbitan ester compounds in combination. The sorbitan compound(s) may be employed in combination with known lubricant(s), extreme-pressure agents or rust-proofing agents.

If the extreme-pressure agent is employed in combination, the lubricant and the extreme-pressure agent are employed in a weight ratio of 30:70 to 70:30. The extreme-pressure agent is reacted with a metal surface under the heat of friction evolved in case partial metal contact is incurred in the boundary lubricant region to form a skin of a reaction product in order to perform the role of preventing abrasion and friction. As the extreme-pressure agent, any of the phosphorus-based extreme-pressure agent, sulfur-based extreme-pressure agent, halogen-based extreme-pressure agent, the organometallic extreme-pressure agent or the composite extreme-pressure agent, may be employed.

As the rust-proofing agent, any of the agents that may be used as rust-proofing agents for a magnetic recording medium may be employed. For example, phenols, naphthols, quinones, heterocyclic compounds containing nitrogen atoms or heterocyclic compounds containing sulfur atoms, may be employed.

If the lubricant and the rust-proofing agents, for example, are used in combination, the rust-proofing agent is first coated on the surface of the magnetic layer and the lubricant is subsequently coated to form a two-layered structure for displaying their respective effects.

The present invention may be applied not only to the so-called coated type magnetic recording medium but also to the thin magnetic metal film type magnetic recording medium. There is no particular limitation to the materials of these magnetic recording media for which any of known sorts of materials may be employed.

First, with the coated magnetic recording medium, the non-magnetic substrate may be constituted by high molecular materials, such as polyesters, polyolefins, celluloses, vinyl resins, polyimides or polycarbonates, metal materials, such as aluminum alloys or titanium alloys, or ceramics, such as alumina glass or glass. There is also no limitation to the configuration of the materials. If the present invention is applied to a magnetic tape, the non-magnetic substrate may be formed by a polyethylene terephthalate film, a polyethylene naphthalate film or an aramide film.

As the magnetic powders of the magnetic paint, powders of magnetic metal materials, such as Fe, Co or Ni, powders of magnetic alloys mainly composed of Fe, Co or Ni, such as Fe—Co, Fe—Ni, Fe—Co—Ni, Co—Ni, Fe—Mn—Zn, Fe—Ni—Zn, Fe—Co—Ni—Cr, Fe—Co—Ni—P, Fe—Co—B, Fe—Co—Cr—B or Fe—Co—V, or powders of magnetic alloys mainly composed of Mn—Bi or Mn—Al. For improving various properties, one or more of elements Al, Si, Ti, Cr, Mn, Cu, Zn, Mg or P may also be added. The magnetic powders may also be powders of known magnetic oxides, such as $\gamma\text{-Fe}_2\text{O}_3$, Co-containing $\gamma\text{-Fe}_2\text{O}_3$, $\text{Fe}_3\text{O}_4$, Co-containing $\gamma\text{-Fe}_3\text{O}_4$, Co-coated $\gamma\text{-Fe}_3\text{O}_4$ or $\text{CrO}_2$.

The binder constituting the magnetic paint in conjunction with the magnetic powders may be enumerated by vinyl based copolymers, polyester-polyurethane based resin, polycarbonate-polyurethane based resin or a nitrocellulose resin.

In addition to the above-mentioned binder and the magnetic powders, dispersants, abrasives, anti-static agents or antiseptics may be added as additives to the magnetic paint. Any of known sorts of materials may be used as these additives.

With the thin magnetic metal film magnetic recording medium, the same non-magnetic substrate as that employed for the coated magnetic recording medium may be employed as the non-magnetic substrate. If a rigid substrate, such as an Al alloy plate or a glass plate, is employed, an oxide skin produced by alumite processing or a Ni—P skin may be formed for hardening its surface.

The thin magnetic metal film is a continuous film produced by such techniques as plating, sputtering or vacuum vapor deposition. These thin magnetic metal films may be enumerated by in-plane magnetic recording magnetic metal films, formed of metals, such as Fe, Co or Ni, or alloys, such as Co—Ni based alloys, Co—Pt based alloys, Co—Pt—Ni based alloys, Fe—Co based alloys, Fe—Ni based alloys, Fe—Co—Ni based alloys, Fe—Ni—B based alloys, Fe—Co—B based alloys or Fe—Co—Ni—B based alloys, and Co—Cr based alloy thin films.

In particular, in the case of an in-plane magnetic recording thin magnetic metal film, an underlying layer of a low melting non-magnetic material such as Bi, Sb, Pb, Sn, Ga, In, Ge, Si or Ti, is pre-formed on a non-magnetic substrate, and a magnetic metal material is vapor-deposited or sputtered from perpendicular direction for diffusing the low melting non-magnetic material into the thin magnetic metal film, thereby eliminating orientation and securing in-plane isotropy as well as improving coercivity.

For employing the thin magnetic metal film magnetic recording medium as a hard disc, a protective film is preferably formed on a magnetic layer. Such protective film may be a hardened protective film and may be enumerated by a carbon film, a diamond-shaped or amorphous carbon film, a chromium oxide film, an $SiO_2$ film or a $ZrO_2$ film. Although such protective film may be formed by sputtering, it may also be formed by any known methods. The film thickness of the protective film is preferably 5 to 100 nm and more preferably 5 to 100 nm. If the protective film is formed on the magnetic layer, the above-mentioned lubricant may be coated on the protective film.

For any of the coated magnetic recording medium or the thin magnetic film magnetic recording medium, a back-coating layer mainly composed of a binder and an abrasive may be formed, if so desired. There is no particular limitation to the film-forming conditions for the back-coating layer if these are routinely applied to the method for preparing the magnetic recording medium. The above-mentioned lubricant may be coated on or incorporated into the back-coating layer. The lubricant may be transferred to the surface of the magnetic layer by holding the lubricant on the surface of the back-coating layer or by holding the lubricant in the state of being wound on a reel.

The sorbitan ester compound contained in the lubricant according to the present invention is an ester compound between perfluoro polyether having a terminal carbonyl group and sorbitan. It is also an ester compound of a hydrocarbon having a terminal carboxyl group with sorbitan.

In the sorbitan ester compound, the perfluoro polyether group functions to raise water-repellency and to reduce the surface energy. Thus the perfluoro polyether group contributes to lowering the frictional coefficient and exhibits superior lubricating effects, while improving thermal stability and durability.

On the other hand, the hydrocarbon group functions to improve solubility of the sorbitan ester compound having a perfluoro polyether group. Thus the solvents derived from a variety of hydrocarbons may be employed, while there is no necessity of employing Freon-based solvents.

Consequently, for any of the coated magnetic recording medium or the thin magnetic film magnetic recording medium, the frictional coefficient may be diminished and the running durability may be improved by having the lubricant exhibiting the above-mentioned effects held by the magnetic layer. In addition, the resistance against abrasion and durability may also be improved.

It is seen that the lubricant employing the sorbitan ester compound having suitably selected substituents exhibits superior lubricating effects under any conditions and are capable of sustaining the superior lubricating effects for prolonged time.

Thus the magnetic recording medium, having the lubricant held on its magnetic layer, exhibits superior running durability and superior resistance against abrasion, whether the recording medium is of the coated type or of the thin magnetic metal film type.

DESCRIPTION OF THE PREFERRED EMBODIMENTS

The present invention will be explained with reference to Examples which are given only by way of illustration and are not intended for limiting the invention.

EXAMPLE 1

First, a sorbitan ester compound (compound A), in which one of four hydroxyl groups of 1,5-sorbitan is linked by ester linkage to a perfluoro polyether having a terminal carboxylic group, represented by $F(CF_2CF_2CF_2O)_nCF_2COOH$ and an other of the hydroxyl groups is linked by ester linkage to a stearic acid ($C_{17}H_{35}COOH$), was synthesized.

Specifically, sorbitan stearate, $F(CF_2CF_2CF_2O)_nCF_2COOH$ and a catalytic amount of p-toluene sulfonic acid were added to toluene anhydride and reaction was carried out under heating and agitation. The evolved moisture was removed by azeotropy with toluene. After termination of the reaction, toluene was removed and a resulting product was purified by silica gel column chromatography using n-hexane containing 5% of acetone as a developing solvent.

Observation of an infrared absorption spectrum of the resulting compound has revealed stretching vibration ascribable to the CH group at 2930 cm$^{-1}$ and stretching vibration presumably ascribable to $F(CF_2CF_2CF_2O)_nCF_2CO$ and $C_{17}H_{35}Co$ at 1795 cm$^{-1}$ and 1740 cm$^{-1}$ respectively On the other hand, stretching vibration proper to the CF group was observed at 1350 to 1000 cm$^{-1}$. It was seen from these results that a sorbitan ester compound could now be synthesized, in which at least one of four hydroxyl groups of 1,5-sorbitan is linked by ester linkage to a perfluoro polyether having a terminal carboxylic group represented by $F(CF_2CF_2CF_2O)_nCF_2COOH$ and an other of the hydroxyl groups is linked by ester linkage to a stearic acid ($C_{17}H_{35}COOH$).

It may be presumed that the compound A thus synthesized has a chemical formula (1) in which the substituents $R_1$ to $R_4$ are as shown in Table 1:

TABLE 1

| Compound | $R_1$ | $R_2$ | $R_3$ | $R_4$ |
|---|---|---|---|---|
| A | Chemical Formula 2 | $C_{17}H_{35}CO$ | H | H |
| B | Chemical Formula 2 | $C_{17}H_{35}CO$ | $C_{17}H_{35}CO$ | H |
| C | Chemical Formula 2 | Chemical Formula 2 | $C_{17}H_{35}CO$ | H |
| D | Chemical Formula 2 | $C_{17}H_{35}CO$ | $C_{17}H_{35}CO$ | $C_{12}H_{25}CO$ |
| E | Chemical Formula 4 | $C_{17}H_{35}CO$ | H | H |
| F | Chemical Formula 4 | $C_6H_5CO$ | $C_6H_{11}CO$ | H |
| G | Chemical Formula 4 | Chemical Formula 5 | $C_{17}H_{35}CO$ | H |
| H | Chemical Formula 4 | Chemical Formula 4 | $C_{17}H_{35}CO$ | $C_{17}H_{35}CO$ |
| I | Chemical Formula 6 | $C_{17}H_{35}CO$ | H | H |
| J | Chemical Formula 6 | $C_9H_{19}CO$ | H | H |
| K | Chemical Formula 6 | $C_{17}H_{33}CO$ | H | H |
| L | Chemical Formula 6 | Chemical Formula 6 | $C_{17}H_{35}CO$ | H |
| M | Chemical Formula 6 | $C_{17}H_{35}CO$ | $C_{17}H_{35}CO$ | H |

TABLE 1-continued

| Compound | $R_1$ | $R_2$ | $R_3$ | $R_4$ |
|---|---|---|---|---|
| N | Chemical Formula 6 | $C_{17}H_{35}CO$ | $C_{17}H_{35}CO$ | $C_{17}H_{35}CO$ |

In the present Example, a lubricant obtained on dissolving the compound A in hexane was coated on a thin magnetic metal film magnetic recording medium.

Specifically, Co was deposited by oblique vapor deposition to a film thickness of 200 nm on a polyethylene terephthalate film having a thickness of 10 μm for forming a magnetic layer consisting in a thin magnetic metal film. On the surface of the magnetic layer was coated the above-mentioned lubricant in an amount of 5 mg/m². The resulting film was cut to width of 8 mm to complete sample tapes of Example 1.

EXAMPLES 2 to 14

Sample tapes of Examples 2 to 14 were prepared in the same way as in Example 1 except using compounds B to N corresponding to the compound of the chemical formula (1) except that the substituents $R_1$ to $R_4$ thereof were of the structures shown in Table 1.

Of the substituents $R_1$ to $R_4$ shown in Table 1, $C_6H_5CO$ and $C_6H_{11}$ were produced as a result of ester linkage of benzoic acid with the hydroxyl group of sorbitan and ester linkage of cyclohexyl carboxylic acid with the hydroxyl group of sorbitan, respectively. On the other hand, the substituent represented by a structure $C_xH_yCO$ was produced as a result of ester linkage of a long-chain carboxylic acid with the hydroxyl group of sorbitan. In the compounds I to N, the substituent $R_1$ or the substituents $R_1$, $R_2$ employed are those shown in the chemical formula (6). Since the carbonyl groups at both terminal ends of the chemical formula (6) are obtained by both terminal carboxylic groups bonded to hydroxyl groups of different sorts of sorbitan, there exist two or three sorbitans in each molecule of each of the compounds I to N.

Comparative Examples 1 to 3

A magnetic tape, as a sample of Comparative Example 1, was prepared in the same way as in Example 1 except using, as a compound contained in the lubricant, a polyfluoro polyether of the formula $F(CF_2CF_2CF_2O)_nCF_2CF_2CH_2OH$ having a terminal hydroxyl group, referred to herein as a compound O.

A magnetic tape, as a sample of Comparative Example 2, was prepared in the same way as in Example 1 except using, as a compound contained in the lubricant, a perfluoro polyether of the formula $F(CF_2CF_2CF_2O)_nCF_2COOH$ having a terminal carboxyl group, referred to herein as a compound P.

A magnetic tape, as a sample of Comparative Example 3, was prepared in the same way as in Example 1 except using, as a compound contained in the lubricant, a sorbitan distearate having the chemical formula (1) as the general formula wherein $R_1$ to $R_4$ were: $R_1$=H, $R_2$=$C_{17}H_{35}CO$, $R_3$=$C_{17}H_{35}CO$ and R=H, referred to herein as a compound Q.

EXAMPLE 15

In the present Example, a lubricant obtained by dissolving the compound A in hexane was coated on a coated type magnetic recording medium.

Specifically, a magnetic paint having the composition of 100 parts by weight of magnetic metal powders with a specific surface area of 50 m²/g, 10.5 parts by weight of a vinyl chloride-vinyl acetate copolymer, 10.5 parts by weight of a polyurethane resin, 5 parts by weight of carbon as an anti-static agent, 150 parts by weight of methylethylketone and 150 parts by weight of cyclohexanone, was prepared.

The above constituents of the magnetic paint were ball-milled for 24 hours and taken out via a filter. The resulting mass was admixed with 4 parts by weight of a hardener manufactured by JAPAN POLYURETHANE Co. Ltd. under a trade name of Coronate-L and further agitated for 30 minutes. The resulting magnetic paint was coated on a 12 μm thick polyethylene terephthalate film, as a non-magnetic substrate, to a dry thickness of 2 μm. The resulting mass was processed for magnetic field orientation, dried, taken up on a reel and calendared. On the surface of the magnetic layer, thus formed, a lubricant obtained on dissolving the compound A in hexane was coated in an amount of 5 mg/m². The resulting film was cut to a width of 8 mm to complete a sample tape of Example 15.

EXAMPLES 16 TO 28

Sample tapes of Examples 16 to 28 were prepared in the same way as in Example 15 except using the compounds B to N as the sorbitan ester compounds, respectively.

Comparative Examples 4 to 6

Magnetic tapes were prepared as sample tapes of the Comparative Examples 4, 5 and 6 in the same way as in Example 15 except using, as the compound contained in the lubricant, the compound O of the Comparative Example 1, compound P of the Comparative Example 2 and the compound Q of the Comparative Example 3, respectively.

Evaluation of Properties

The effects of the lubricant on the thin magnetic film type magnetic recording medium in improving running durability were checked.

Of the sample tapes of Examples 1 to 14 and Comparative Examples 1 to 3, prepared as described above, measurements of the frictional coefficient, still durability and the shuttle durability under atmosphere conditions m, p and y as shown in Table 2:

TABLE 2

| | Atmosphere Conditions |
|---|---|
| α | 25° C., 60% RH |
| β | 40° C., 80% RH |
| γ | −5° C. |

Specifically, after pre-set picture signals were recorded by a video tape recorder on the respective sample tapes, measurements were made of durability for still picture reproduction (still durability) and durability for fast feed and reproduction (shuttle durability). The still durability was evaluated in terms of time duration until an output in the paused state was lowered by 3 dB, while the shuttle durability was measured in terms of the number of times of shuttle running operations, each continuing for 2 minutes, until the output was decreased by 3 dB. The results of measurement in the respective sample tapes and the sorts of the compounds contained in the lubricant are shown in Table 3 to 6.

TABLE 3

| | Conditions | Frictional Coefficients | Still Durability (min) | Shuttle Durability (Number of Times) |
|---|---|---|---|---|
| Ex. 1 | α | 0.20 | >120 | >150 |
| (Compound A) | β | 0.27 | >120 | >150 |
| | γ | 0.20 | >120 | >150 |
| Ex. 2 | α | 0.19 | >120 | >50 |
| (Compound B) | β | 0.28 | >120 | >150 |
| | γ | 0.19 | >120 | >150 |
| Ex. 3 | α | 0.20 | >120 | >150 |
| (Compound C) | β | 0.26 | >120 | >150 |
| | γ | 0.20 | >120 | >150 |
| Ex. 4 | α | 0.22 | >120 | >150 |
| (Compound D) | β | 0.29 | >120 | >150 |
| | γ | 0.23 | >120 | >150 |

TABLE 4

| | Conditions | Frictional Coefficients | Still Durability (min) | Shuttle Durability (Number of Times) |
|---|---|---|---|---|
| Ex. 5 | α | 0.21 | >120 | >150 |
| (Compound E) | β | 0.28 | >120 | >150 |
| | γ | 0.22 | >120 | >150 |
| Ex. 6 | α | 0.24 | >120 | >150 |
| (Compound F) | β | 0.31 | >120 | >150 |
| | γ | 0.24 | >120 | >150 |
| Ex. 7 | α | 0.21 | >120 | >150 |
| (Compound G) | β | 0.27 | >120 | >150 |
| | γ | 0.22 | >120 | >150 |
| Ex. 8 | α | 0.23 | >120 | >150 |
| (Compound H) | β | 0.28 | >120 | >150 |
| | γ | 0.22 | >120 | >150 |

TABLE 5

| | Conditions | Frictional Coefficients | Still Durability (min) | Shuttle Durability (Number of Times) |
|---|---|---|---|---|
| Ex. 9 | α | 0.19 | >120 | >150 |
| (Compound I) | β | 0.27 | >120 | >150 |
| | γ | 0.20 | >120 | >150 |
| Ex. 10 | α | 0.21 | >120 | >150 |
| (Compound J) | β | 0.27 | >120 | >150 |
| | γ | 0.22 | >120 | >150 |
| Ex. 11 | α | 0.21 | >120 | >150 |
| (Compound K) | β | 0.26 | >120 | >150 |
| | γ | 0.22 | >120 | >150 |
| Ex. 12 | α | 0.17 | >120 | >150 |
| (Compound L) | β | 0.26 | >120 | >150 |
| | γ | 0.17 | >120 | >150 |
| Ex. 13 | α | 0.17 | >120 | >150 |
| (Compound M) | β | 0.24 | >120 | >150 |
| | γ | 0.18 | >120 | >150 |
| Ex. 14 | α | 0.23 | >120 | >150 |
| (Compound N) | β | 0.29 | >120 | >150 |
| | γ | 0.22 | >120 | >150 |

TABLE 6

|  | Conditions | Frictional Coefficients | Still Durability (min) | Shuttle Durability (Number of Times) |
| --- | --- | --- | --- | --- |
| Comp. Ex. 1 | α | 0.32 | >120 | >150 |
| (Compound | β | 0.41 | 78 | 98 |
| O) | γ | 0.31 | 65 | 79 |
| Comp. Ex. 2 | α | 0.32 | >120 | >150 |
| (Compound | β | 0.44 | 58 | 78 |
| P) | γ | 0.33 | 64 | 85 |
| Comp. Ex. 3 | α | 0.24 | 58 | 56 |
| (Compound | β | 0.33 | 45 | 85 |
| Q) | γ | 0.24 | 39 | 46 |

It is seen from Tables 3 to 6 that the sample tapes of Examples 1 to 14 are low in frictional coefficient and superior in still durability and shuttle durability under any atmosphere conditions. Conversely, the sample tapes of Comparative Examples 1 to 3 are high in frictional coefficient and significantly inferior in still durability and shuttle durability.

It may be seen from this that the sorbitan ester compounds (compounds A to N) having perfluoro polyether groups, employed in Examples 1 to 14, are superior in lubricating effects and hence in effects in improving running durability of the magnetic recording medium to the perfluoro polyether based compounds employed in Comparative Examples 1 and 2 (compounds O and P) or sorbitan ester compound (compound Q) not having the perfluoro polyether group, employed in Comparative Example 3 (compound Q).

The coated type magnetic recording medium was then checked as to the effect of the lubricant in improving resistance against abrasion and durability.

Of the sample tapes of Examples 15 to 28 and Comparative Examples 4 to 6, thus prepared, measurements were made of the frictional coefficient, stick slip and dropout under the condition α. On the other hand, measurements were similarly made of the frictional coefficient, stick slip and dropout after ageing for seven days under an atmosphere condition β. The stick slip was evaluated as 0, Δ and X if the frictional coefficient at the time of frictional contact is less than 0.6, on the order of 0.6 and higher than 0.6, respectively. The dropout was evaluated in terms of number of times of occurrence of output lowering by 10 dB or more for 3 μsec during signal reproduction continuing 3 minutes. The measured results are shown in Tables 7 to 10, along with the sorts of the compounds contained in the lubricant.

TABLE 7

|  | Conditions | Frictional Coefficients | Stick Slip | Dropout (Number of Times |
| --- | --- | --- | --- | --- |
| Ex. 15 | Before Ageing | 0.21 | o | 68 |
| (Compound A) | After Ageing | 0.22 | o | 85 |
| Ex. 16 | Before Ageing | 0.20 | o | 71 |
| (Compound B) | After Ageing | 0.21 | o | 78 |
| Ex. 17 | Before Ageing | 0.20 | o | 95 |
| (Compound C) | After Ageing | 0.22 | o | 119 |
| Ex. 18 | Before Ageing | 0.24 | o | 70 |
| (Compound D) | After Ageing | 0.26 | o | 85 |

TABLE 8

|  | Conditions | Frictional Coefficients | Stick Slip | Dropout (Number of Times) |
| --- | --- | --- | --- | --- |
| Ex. 19 | Before Ageing | 0.21 | o | 65 |
| (Compound E) | After Ageing | 0.22 | o | 78 |
| Ex. 20 | Before Ageing | 0.22 | o | 71 |
| (Compound F) | After Ageing | 0.27 | o | 95 |
| Ex. 21 | Before Ageing | 0.22 | o | 59 |
| (Compound G) | After Ageing | 0.23 | o | 85 |
| Ex. 22 | Before Ageing | 0.24 | o | 75 |
| (Compound H) | After Ageing | 0.38 | o | 96 |

TABLE 9

|  | Conditions | Frictional Coefficients | Stick Slip | Dropout (Number of Time) |
| --- | --- | --- | --- | --- |
| Example 23 | Before Ageing | 0.20 | o | 89 |
| (Compound I) | After Ageing | 0.22 | o | 95 |
| Example 24 | Before Ageing | 0.22 | o | 78 |
| (Compound J) | After Ageing | 0.23 | o | 89 |
| Example 25 | Before Ageing | 0.22 | o | 69 |
| (Compound K) | After Ageing | 0.23 | o | 87 |
| Example 26 | Before Ageing | 0.19 | o | 84 |
| (Compound L) | After Ageing | 0.21 | o | 98 |
| Example 27 | Before Ageing | 0.20 | o | 74 |
| (Compound M) | After Ageing | 0.22 |  | 96 |
| Example 28 | Before Ageing | 0.23 | o | 85 |
| (Compound N) | After Ageing | 0.27 | o | 105 |

TABLE 10

|  | Conditions | Frictional Coefficients | Stick Slip | Dropout (Number of Times) |
| --- | --- | --- | --- | --- |
| Comp. Ex. 4 | Before Ageing | 0.29 | o | 120 |
| (Compound O) | After Ageing | 0.30 | x | 120 |
| Comp. Ex. 5 | Before Ageing | 0.31 | o | 123 |
| (Compound P) | After Ageing | 0.33 | x | 123 |
| Comp. Ex. 6 | Before Ageing | 0.25 | o | 95 |
| (Compound Q) | After Ageing | 0.30 | Δ | 151 |

It is seen from Tables 7 to 10 that the sample tapes of Examples 15 to 28 are low in frictional resistance and superior in both stick slip and dropout both before and after ageing. Conversely, the sample tapes of Comparative Examples 4 to 6 are significantly deteriorated in both stick slip and dropout after ageing.

Thus it is seen that the sorbitan ester compounds having perfluoro polyether groups, employed in Examples 15 to 28 (compounds A to N) are superior in lubricating effects and hence in the effect in improving the resistance against abrasion and durability of the magnetic recording medium to the perfluoro polyether based compounds employed in Comparative Examples 4 and 5 or to the sorbitan ester compounds not having the perfluoro polyether groups, employed in Comparative Example 6.

What is claimed is:

1. A magnetic recording medium comprising:

a non-magnetic substrate having a surface:

a magnetic recording layer disposed on the surface; and a lubricating layer disposed on the magnetic recording layer, said lubricating layer comprising a sorbitan polyester having the formula:

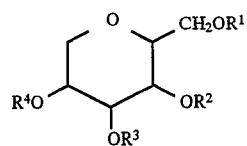

wherein at least one of $R^1$, $R^2$, $R^3$ and $R^4$ is acyl-terminated residue of a carboxyl-terminated perfluoropolyether compound, at least one of $R^1$, $R^2$, $R^3$ and $R^4$ is an acyl terminated residue of a carboxyl-terminated hydrocarbon and any remaining $R^1$, $R^2$, $R^3$ and $R^4$ groups are hydrogen.

2. A magnetic recording medium as defined in claim 1, wherein the magnetic recording layer comprises a magnetic metal thin film.

3. A magnetic recording medium as defined in claim 1, wherein said magnetic layer is a coating layer of a magnetic paint comprising magnetic powders and a binder.

4. A magnetic recording medium as defined in claim 5, wherein said lubricant is incorporated in the magnetic paint.

5. A lubricant for a magnetic recording medium comprising:

a sorbitan polyester having the formula:

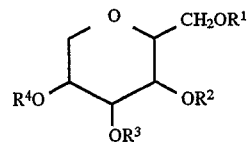

wherein at least one of $R^1$, $R^2$, $R^3$ and $R^4$ is acyl-terminated residue of a carboxyl-terminated perfluoropolyether compound, at least one of $R^1$, $R^2$, $R^3$ and $R^4$ is an acyl terminated residue of a carboxyl-terminated hydrocarbon and any remaining $R^1$, $R^2$, $R^3$ and $R^4$ groups are hydrogen.

6. A lubricant as defined in claim 5, wherein said carboxyl-terminated hydrocarbon contains ten or more carbon atoms.

7. A lubricant for a magnetic recording medium comprising:

a sorbitan diester obtained by esterifying at least one hydroxyl group on 1,5-sorbitan with a carboxyl-terminated perfluoropolyether and by esterifying at least one other hydroxyl group on 1,5-sorbitan with a carboxyl-terminated hydrocarbon and oligomers of said sorbitan diesters wherein at least one hydroxyl group on at least two 1,5-sorbitan compounds are esterified to a common perfluoropolyether having a terminal carboxyl group on each end.

* * * * *